(12) United States Patent
Harris et al.

(10) Patent No.: US 8,619,365 B2
(45) Date of Patent: Dec. 31, 2013

(54) ANTI-REFLECTIVE COATING FOR OPTICAL WINDOWS AND ELEMENTS

(75) Inventors: Michael David Harris, Horseheads, NY (US); Christopher Morton Lee, Corning, NY (US); Lawrence George Mann, Painted Post, NY (US); Mike Xu Ouyang, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 599 days.

(21) Appl. No.: 12/575,820

(22) Filed: Oct. 8, 2009

(65) Prior Publication Data

US 2010/0060979 A1    Mar. 11, 2010

Related U.S. Application Data

(63) Continuation-in-part of application No. 11/261,172, filed on Oct. 28, 2005, now abandoned.

(60) Provisional application No. 60/640,729, filed on Dec. 29, 2004.

(51) Int. Cl.
*G02B 1/11* (2006.01)
*G02B 5/20* (2006.01)

(52) U.S. Cl.
USPC ............ 359/586; 359/359; 359/357; 359/588

(58) Field of Classification Search
USPC .............. 359/580, 586, 359, 337.1, 357, 584, 359/588; 428/432
See application file for complete search history.

(56) References Cited

U.S. PATENT DOCUMENTS

| | | | |
|---|---|---|---|
| 3,185,020 A | | 5/1965 | Thelen |
| 4,387,960 A | | 6/1983 | Tani |
| 4,725,109 A | | 2/1988 | Wank et al. |
| 5,170,291 A | | 12/1992 | Szczyrbowski et al. |
| 5,450,238 A | | 9/1995 | Bjornard et al. |
| 5,579,162 A | * | 11/1996 | Bjornard et al. ............ 359/580 |

(Continued)

FOREIGN PATENT DOCUMENTS

| | | | |
|---|---|---|---|
| JP | 61137840 A | 6/1986 | |
| JP | 63113501 A | 5/1988 | |

(Continued)

OTHER PUBLICATIONS

DLP—The Digital Display Technology of the Future—INFOCOMM '97 Jun. 5-7, 1997 Los Angeles, California USA.

(Continued)

*Primary Examiner* — Audrey Y Chang
(74) *Attorney, Agent, or Firm* — Walter M Douglas

(57) ABSTRACT

Multilayer anti-reflective coatings having four or more layers are disclosed. In one aspect, the multilayer anti-reflective coating comprises a first layer having a refractive index n1, where n1<1.4, and an optical thickness of $(0.25\pm5\%) \lambda_o$ nm; a second layer adjacent to the first layer, the second layer having a refractive index n2, where n2≥1.8, and an optical thickness of $(0.5\pm5\%) \lambda_o$ nm; a third layer adjacent to the second layer, the third layer having a refractive index n3, where 1.4≤n3<1.6, and an optical thickness of $(0.1\pm5\%) \lambda_o$ nm; and a fourth layer adjacent to the third layer, the fourth layer having a refractive index n4, where n4≥1.8, and an optical thickness of $(0.05\pm10\%) \lambda_o$ nm; where $\lambda_o$ is a wavelength in the visible light range.

12 Claims, 7 Drawing Sheets

(56) References Cited

U.S. PATENT DOCUMENTS

| | | | |
|---|---|---|---|
| 6,280,848 B1 | 8/2001 | Okumura et al. | |
| 6,974,517 B2 | 12/2005 | Hanna | |
| 2002/0154387 A1* | 10/2002 | Mori et al. | 359/337.1 |
| 2003/0077458 A1* | 4/2003 | Korenaga et al. | 428/432 |

FOREIGN PATENT DOCUMENTS

| | | |
|---|---|---|
| JP | 6347603 A | 12/1994 |
| JP | 11248904 A | 9/1999 |
| JP | 2000111704 A | 4/2000 |

OTHER PUBLICATIONS

"Emerging Digital Micromirror Device (DMD) Appliocations", Dana Dudley, et al Texas Instruments, Proceedings of SPIE vol. 4985 (2003) pp. 14-25.

"Physics of Thin Films—Advances in Research and Development", Academic Press NY and London, 1963 pp. 145-186.

Notification of Ground for Rejection in Japanese Patent Application No. 2007-549520, Jan. 26, 2012.

* cited by examiner

US 8,619,365 B2

ANTI-REFLECTIVE COATING FOR OPTICAL WINDOWS AND ELEMENTS

CROSS-REFERENCE TO RELATED APPLICATIONS

This application is a continuation-in-part of U.S. patent application Ser. No. 11/261,172 (filed Oct. 28, 2005), now abandoned, which claims the benefit of U.S. Provisional Patent Application No. 60/640,729 (filed Dec. 29, 2004).

TECHNICAL FIELD

The present invention is directed to multilayer anti-reflective coatings for substrates. More particularly, the present invention is directed to multilayer anti-reflective coatings applied on windows of digital mirror devices ("DMD") containing digital light processing mirrors ("DLP") used in digital projections systems.

BACKGROUND

The projection of images using digital light processing methods typically requires the use of a plurality or array of mirrors or micromirrors to focus the light on a screen. As seen in FIG. 1, the array contains a plurality of mirrors 2 that can be tilted to selected angles. Some current examples of the devices that use these mirrors and arrays are rear projection televisions, front projection devices for use in business and cinematic environments, and for marquee displays. FIG. 2 is a picture of a typical Texas Instruments' Digital Micromirror Device ("DMD") in which a plurality of mirrors is encased in a hermetically sealed housing 4 having a window 6 for the passage of light to and from the mirrors located therein.

FIG. 3 is a schematic of the principle elements of a typical DMD device 10 containing a plurality or array of mirrors. Not shown in FIG. 3 is the housing that surrounds the device, as illustrated at 4 in FIG. 2. The principle elements of the DMD device 10 are the array of mirrors 12, the chrome aperture 14 (gray-filled rectangles), and the window 16 overlying the aperture 14 and array of mirrors 12. When the DMD device 10 is used in, for example, a projection system, incident light 22 (within the solid-line cone 23) from a light source 20 is focused at an angle, for example, an angle in the range of 10-30 degrees (10° to 30°) from the perpendicular to the plane of the window 16 overlying the array of mirrors 12. The incident light 22 passes through the window 16, strikes the array of mirrors 12 and is reflected by the individual mirrors in the array of mirrors 12. Each mirror in the array of mirrors 12 is capable of being tilted at a selected angle determined by the manufacturer. When a mirror in the array of mirrors 12 is tilted so that it is in the ON position, the light is reflected perpendicular to plane of the window 16 as indicated by arrow 30 (within the dot/dash-line cone 31) toward a detector 40. When a mirror in the array of mirrors 12 is tilted so that it is in the OFF position, the light is reflected through window 16 away from detector 40, for example, in the direction indicated by arrow 32 (within the dashed-line cone 33). In either ON or OFF position the light passes through window 16. The ratio of the intensity ("I") between the ON and OFF positions is defined as the "contrast ratio" ("CR"), where $CR=I_{on}/I_{off}$.

As illustrated in FIG. 3, the DMD device 10 is illuminated with an f/3.0 cone of light. As illustrated, the incident illuminating white light is coming from a 100-Watt tungsten lamp (or other lamp capable of producing white light) at an angle of 26° to the perpendicular of the window 16. The detector 40 collects light at an f/3.0 cone and is centered above the DMD device 10 as illustrated, normal to the window 16. The DMD device 10 operates in the $I_{on}$ and $I_{off}$ states. In the ON state, $I_{on}$ is dominated by the DLP window's (16) normal transmission of reflected light from the ON state mirrors behind window 16 toward the detector 40. In the OFF state $I_{off}$ is dominated by the residual reflectance from window 16 at 10°-30° incidence angle. Since $I_{off}$ is a small value and anti-reflective coating ("ARC") residual reflectance contributes a large amount to $I_{off}$, it is important that the ARC be designed so that $I_{off}$ is minimized. In particular, one needs to design an ARC that has the lowest reflectivity at the selected incoming light incident angle with the lowest polarization dependence over a wide wavelength range. In the above example, one would wish to design an ARC which has the lowest reflectivity at 26° incident angle with the lowest polarization dependence at a wavelength range in 480-640 nm range. Minimizing $I_{off}$ reflectance improves, for example, the contrast ratio.

While antireflective coating for windows of DMDs are known, little or no effort has been made to optimize the window 16 coating for angular operation. For example, 3- and 4-layer coating with quarter wavelength thickness are known. In view of the critical nature of anti-reflective coatings toward minimizing $I_{off}$, the development of optimized anti-reflective coating is important to the future development of DMDs and the systems that utilize them. Accordingly, the present invention describes optimized anti-reflective coatings for minimizing $I_{off}$.

SUMMARY

In a first aspect of the present invention, a multilayer anti-reflective coating for a substrate comprises: (a) a first layer having a refractive index n1, where n1<1.4, and an optical thickness of $(0.25\pm5\%)\lambda_o$ nm, where $\lambda_o$ is a wavelength in the visible light range; (b) a second layer adjacent to the first layer, the second layer having a refractive index n2, where n2≥1.8, and an optical thickness of $(0.5\pm5\%)\lambda_o$ nm, where $\lambda_o$ is a wavelength in the visible light range; (c) a third layer adjacent to the second layer, the third layer having a refractive index n3, where 1.4≤n3<1.6, and an optical thickness of $(0.1\pm5\%)\lambda_o$ nm, where $\lambda_o$ is a wavelength in the visible light range; (d) a fourth layer adjacent to the third layer, the fourth layer having a refractive index n4, where n4≥1.8, and an optical thickness of $(0.05\pm10\%)\lambda_o$ nm, where $\lambda_o$ is a wavelength in the visible light range.

In certain embodiments of the first aspect of the present invention, the second layer and the fourth layer comprise a material selected from $HfO_2$, $Ta_2O_5$, $ZrO_2$, $TiO_2:Pr_2O_3$, $Nb_2O_5$, $TiO_2$, $Nb_2O_5:TiO_2$, MO-01, $ZrO_2$, and $Y_2O_3$.

In certain embodiments of the first aspect of the present invention, the third layer comprises a material selected from $SiO_2$, $CaF_2$, and $BaF_2$.

In certain embodiments of the first aspect of the present invention, the first layer comprises $MgF_2$.

In certain embodiments of the first aspect of the present invention, $\lambda_o$ is approximately 550 nm.

In a second aspect of the present invention, a multilayer anti-reflective coating for a substrate comprises: (a) a first layer having a refractive index n1, where n1<1.4, and an optical thickness of $(0.23\pm5\%)\lambda_o$ nm, where $\lambda_o$ is a wavelength in the infrared range; (b) a second layer adjacent to the first layer, the second layer having a refractive index n2, where n2≥1.8, and an optical thickness of $(0.35\pm5\%)\lambda_o$ nm, where $\lambda_o$ is a wavelength in the infrared range; (c) a third layer adjacent to the second layer, the third layer having a refractive index n3, where 1.4≤n3<1.6, and an optical thickness of $(0.06\pm10\%)\lambda_o$ nm, where $\lambda_o$ is a wavelength in the infrared range; and (d) a fourth layer adjacent to the third layer, the fourth layer having a refractive index n4, where n4≥1.8, and an optical thickness of (0.06±10%) λ$_o$ nm, where λ$_o$ is a wavelength in the infrared range.

In certain embodiments of the second aspect of the present invention, the second layer and the fourth layer comprise a material selected from HfO$_2$, Ta$_2$O$_5$, ZrO$_2$, TiO$_2$—Pr$_2$O$_3$, Nb$_2$O$_5$, TiO$_2$, Nb$_2$O$_5$:TiO$_2$, MO-01, ZrO$_2$, and Y$_2$O$_3$.

In certain embodiments of the second aspect of the present invention, the third layer comprises a material selected from SiO$_2$, CaF$_2$, and BaF$_2$.

In certain embodiments of the second aspect of the present invention, the first layer comprises MgF$_2$.

In certain embodiments of the second aspect of the present invention, λ$_o$ is approximately 1550 nm.

In a third aspect of the invention, a multilayer anti-reflective coating for a substrate comprises: (a) a first layer having a refractive index n1, where 1.6≤n1<1.8, and an optical thickness of (0.02±10%) λ$_o$ nm, where λ$_o$ is a wavelength in the visible light range; (b) a second layer adjacent to the first layer, the second layer having a refractive index n2, where n2<1.6, and an optical thickness of (0.23±5%) λ$_o$ nm, where λ$_o$ is a wavelength in the visible light range; (c) a third layer adjacent to the second layer, the third layer having a refractive index n3, where n3≥2.2, and an optical thickness of (0.50±5%) λ$_o$ nm, where λ$_o$ is a wavelength in the visible light range; (d) a fourth layer adjacent to the third layer, the fourth layer having a refractive index n4, where 1.4≤n4<1.6, and an optical thickness of (0.09±10%) λ$_o$ nm, where λ$_o$ is a wavelength in the visible light range; (e) a fifth layer adjacent to the fourth layer, the fifth layer having a refractive index n5, where 1.8≤n5<2.2, and an optical thickness of (0.09±10%) λ$_o$ nm, where λ$_o$ is a wavelength in the visible light range.

In certain embodiments of the third aspect of the present invention, the fifth layer comprises HfO$_2$, Ta$_2$O$_5$, and TiO$_2$:Pr$_2$O$_3$.

In certain embodiments of the third aspect of the present invention, the fourth layer comprises a material selected from SiO$_2$, CaF$_2$, and BaF$_2$.

In certain embodiments of the third aspect of the present invention, the third layer comprises a material selected from Nb$_2$O$_5$:TiO$_2$, MO-01, Nb$_2$O$_5$, TiO$_2$, ZrO$_2$, and Y$_2$O$_3$.

In certain embodiments of the third aspect of the present invention, the second layer comprises a material selected from MgF$_2$, SiO$_2$, CaF$_2$, and BaF$_2$.

In certain embodiments of the third aspect of the present invention, the first layer comprises Al$_2$O$_3$.

In certain embodiments of the third aspect of the present invention, λ$_o$ is approximately 550 nm.

In other aspects of the present invention, a multilayer anti-reflective coating according to the first aspect, second aspect, or third aspect of the present invention is applied on a glass or glass-ceramic substrate transmissive to light to form an optical window.

BRIEF DESCRIPTION OF DRAWINGS

The following is a description of the figures in the accompanying drawings. The figures are not necessarily to scale, and certain features and certain views of the figures may be shown exaggerated in scale or in schematic in the interest of clarity and conciseness.

DETAILED DESCRIPTION

Figure 1:
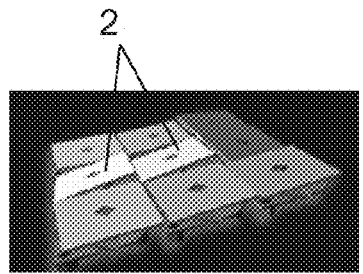
FIG. 1 illustrates a mirror array of a digital mirror device known in the art.
Figure 2:
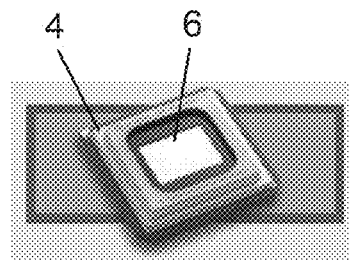
FIG. 2 is an external view of a commercially available digital mirror device.
Figure 3:
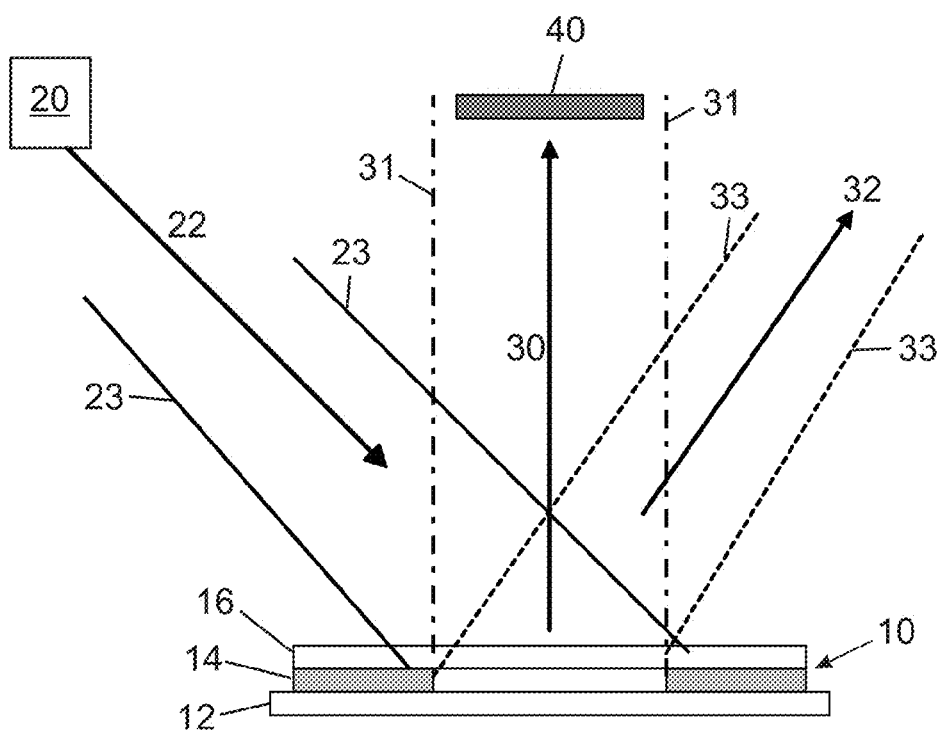
FIG. 3 is a side view of a digital mirror device illustrating selected features of the device and how light is incident on and reflected by the mirror art of the digital mirror device.

The present invention will now be described in detail, with reference to the accompanying drawings. In this detailed description, numerous specific details may be set forth in order to provide a thorough understanding of the invention. However, it will be apparent to one skilled in the art when the invention may be practiced without some or all of these specific details. In other instances, well-known features and/or process steps may not be described in detail so as not to unnecessarily obscure the invention. In addition, like or identical reference numerals may be used to identify common or similar elements.

The present invention is directed to multilayer anti-reflective (AR) coatings. The multilayer AR coatings of the present invention have four or more layers, with each layer of AR coating being made of an optical coating having a selected refractive index profile. Table 1 below defines terms that will be used in describing the layers of the AR coatings. In Table 1, a VL optical coating is one that has a refractive index less than 1.4. An L optical coating is one that has a refractive index in a range from 1.4 to 1.6. An M optical coating is one that has a refractive index in a range from 1.6 to 1.8. An MH optical coating is one that has a refractive index in a range from 1.8 to 2.2. An H optical coating is one that has a refractive index greater than 2.2. Examples of VL, L, M, MH, and H optical coatings are given in Table 1. However, the present invention is not limited to the examples of optical coatings listed in Table 1—any optical coating having a refractive index within one of the defined refractive index ranges may be used.

TABLE 1

| Group | Refractive Index (n) | Examples of Optical Coatings |
|---|---|---|
| Very low index (VL) | n < 1.4 | MgF$_2$ |
| Low index (L) | 1.4 ≤ n < 1.6 | SiO$_2$, CaF$_2$, BaF$_2$ |
| Medium index (M) | 1.6 ≤ n < 1.8 | Al$_2$O$_3$, CeF$_3$ |
| Medium high index (MH) | 1.8 ≤ n < 2.2 | HfO$_2$, Ta$_2$O$_5$, TiO$_2$:Pr$_2$O$_3$ |
| High index (H) | n ≥ 2.2 | Nb$_2$O$_5$, TiO$_2$, ZrO$_2$, Y$_2$O$_3$, Nb$_2$O$_5$:TiO$_2$, MO-01* |

*MO-01 is a compound made from Nb$_2$O$_5$:TiO$_2$ = 1:1 (mol %).

Figure 4:
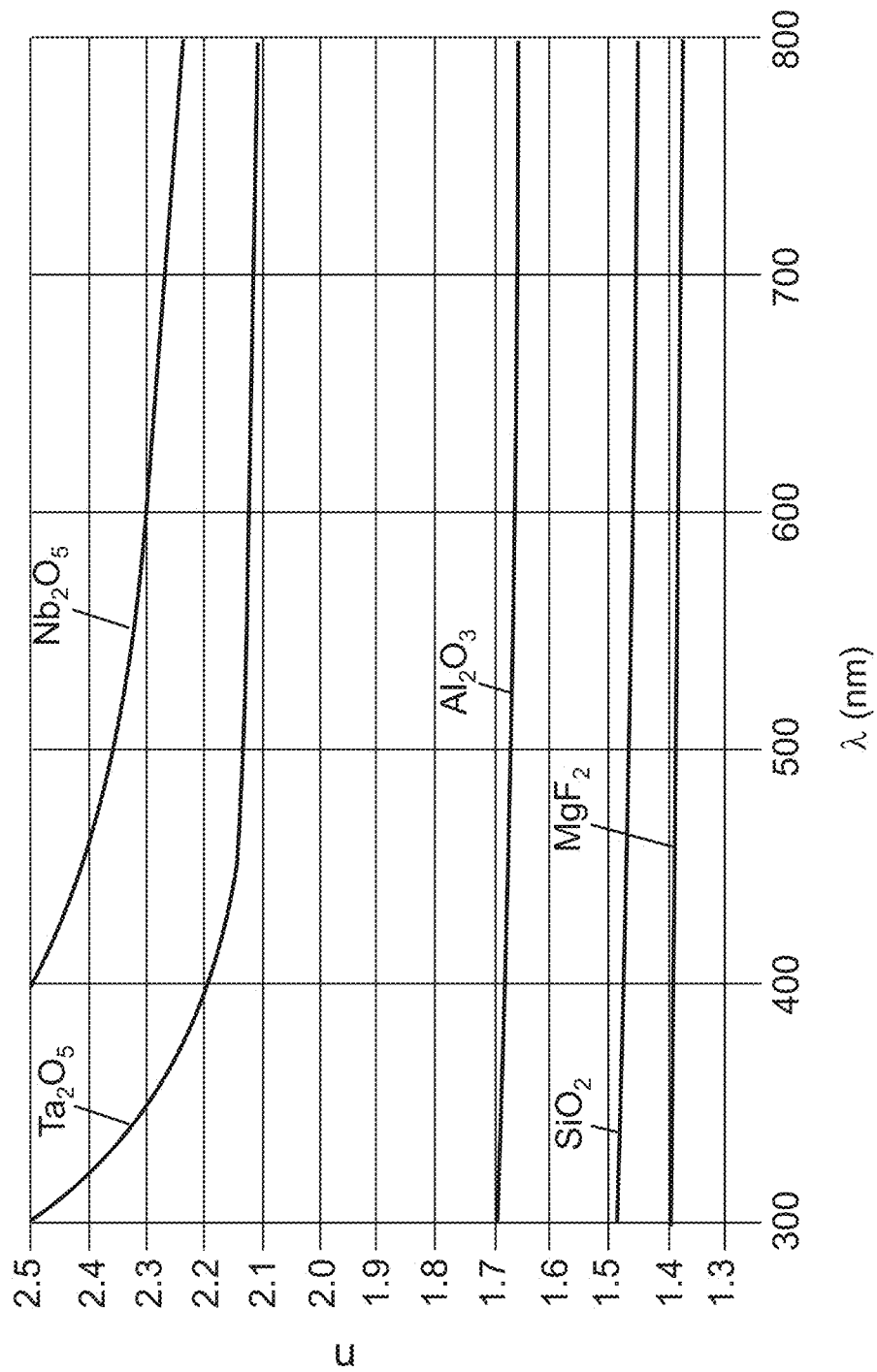
FIG. 4 is a graph illustrating material dispersion, i.e., dependence of refractive index on wavelength.

Refractive index depends on wavelength so that an optical coating typically has a range of refractive indices over a specified wavelength range rather than a single-valued refractive index. FIG. 4 illustrates refractive index versus wavelength dependence for $MgF_2$, $Al_2O_3$, $Nb_2O_5$, $SiO_2$, and $Ta_2O_5$. In FIG. 4, except for $Nb_2O_5$, the variation in refractive index for these materials over the visible light range is generally small. The optical coatings in Table 1 are listed based on their refractive indices in the visible light range. If a different wavelength range is considered, the optical coatings may end up in other refractive index groups or belong to more than one refractive index group.

Figure 5:
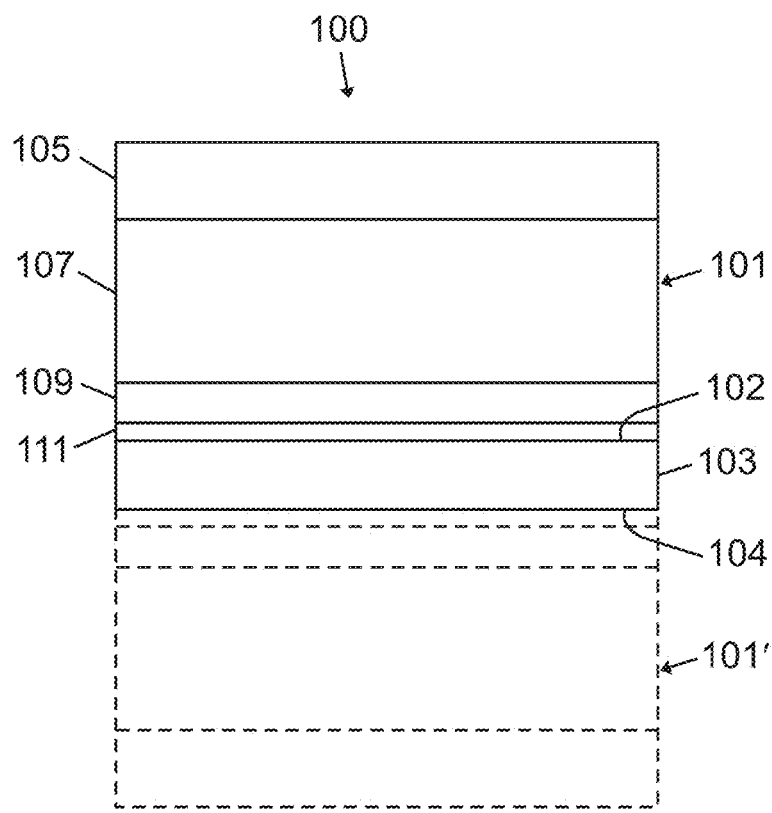
FIG. 5 is a schematic of an optical window according to certain aspects of the present invention.
Figure 6:
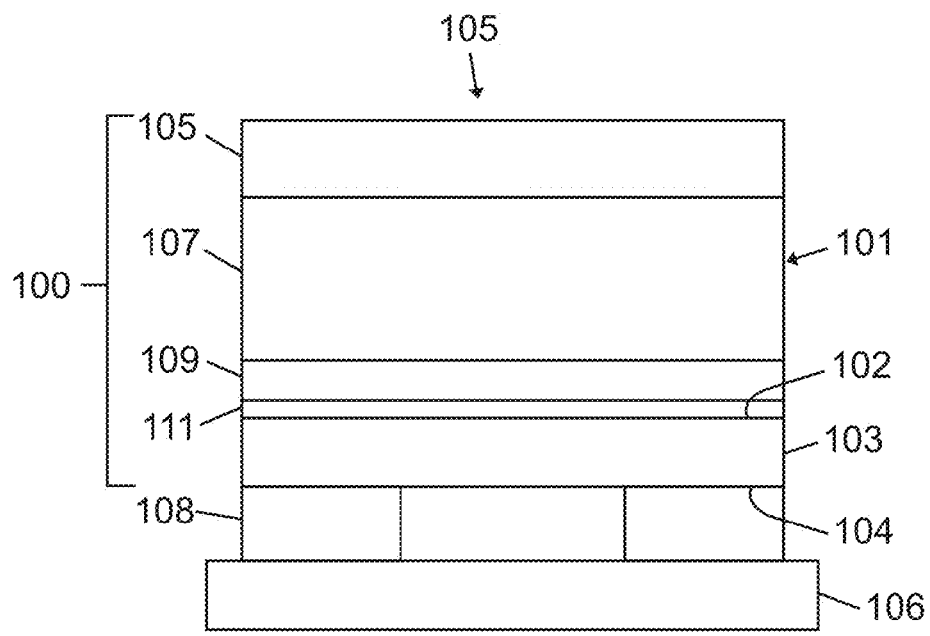
FIG. 6 is a schematic of a DMD device incorporating the optical window of FIG. 5.

FIG. 5 shows an optical window 100 including a 4-layer structure (4 L-structure) AR coating 101 applied on a front surface 102 of a substrate 103. A 4 L-structure AR coating may also be applied to a back surface 104 of the substrate 103, as indicated by dashed lines 101'. The substrate 103 may be made of a glass or glass-ceramic material that can transmit light in a desired wavelength range—the desired wavelength range would be determined by the application in which the optical window 100 would be used. For example, the substrate 103 may transmit light in a wavelength range selected from ultraviolet range (200 nm to 400 nm), visible range (400 nm to 760 nm), and near-infrared range (800 to 1700 nm). FIG. 6 shows the optical window 100 incorporated in a DMD device 105. In FIG. 6, the DMD device 105 includes an array of mirrors 106, a chrome aperture 108 formed on the array of mirrors 106, and the optical window 100 formed on the chrome aperture 108. The principles of operation of a DMD device have been described above.

Returning to FIG. 5, the 4 L-structure AR coating 101 includes first (or outermost) layer 105, second layer 107, third layer 109, and fourth (or innermost) layer 111. The first layer 105 is made of a VL optical coating. The second layer 107 is made of an H or MH optical coating. The third layer 109 is made of an L optical coating. The fourth layer 111 is made of an H or MH optical coating. The second layer 107 and the fourth layer 111 may be made of the same or different materials. The multilayer structure of the optical window 100 can be expressed as VL/(H or MH)/L/(H or MH)/substrate. Table 2 shows the different possibilities for the multilayer structure of the optical window 100. (Note that Table 2 only shows AR coating on one side of the substrate, but the AR coating can be on both sides of the substrate. For an optical window with AR coating on both sides of the substrate, the multilayer structure of the optical window can be expressed as VL/(H or MH)/L/(H or MH)/substrate/(H or MH)/L/(H or MH)/VL.)

In a first aspect of the present invention, the optical thickness of the first layer 105 is $(0.25\pm5\%)\lambda_o$ nm; the optical thickness of the second layer 107 is $(0.5\pm5\%)\lambda_o$ nm; the optical thickness of the third layer 109 is $(0.1\pm5\%)\lambda_o$ nm; and the optical thickness of the fourth layer 111 is $(0.05\pm10\%)\lambda_o$ nm. In the first aspect, the reference wavelength $\lambda_o$ is selected from the visible light range. The reference wavelength $\lambda_o$ may be selected from the range of 480 nm to 560 nm. Preferably, the reference wavelength $\lambda_o$ is 550 nm. With the optical thickness and refractive index of each layer known, the corresponding physical thickness of the layer can be determined. The optical design in this first aspect of the present invention is designed to achieve low reflectivity with a wide range of angle of incidence, e.g., 0 to 45 degrees. The optical design is also insensitive to S and P polarizations, which is necessary for wide angle incidence and for laser and LED light sources.

Figure 7:
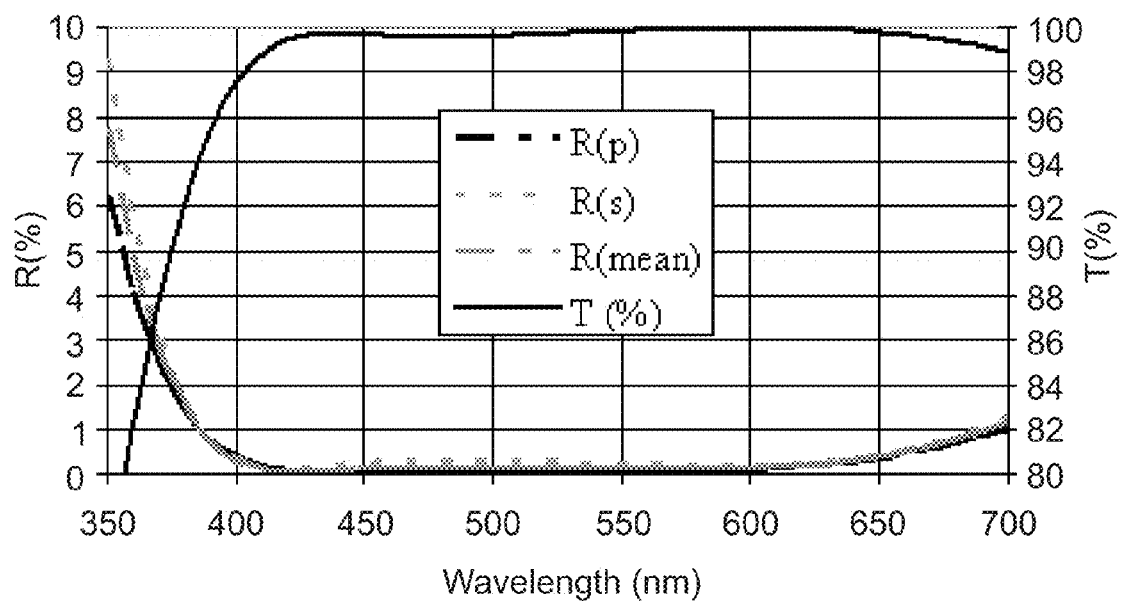
FIG. 7 is a graph illustrating optical performance of an optical window having the structure shown in FIG. 5 with visible light at 30-degree angle of incidence.
Figure 10:
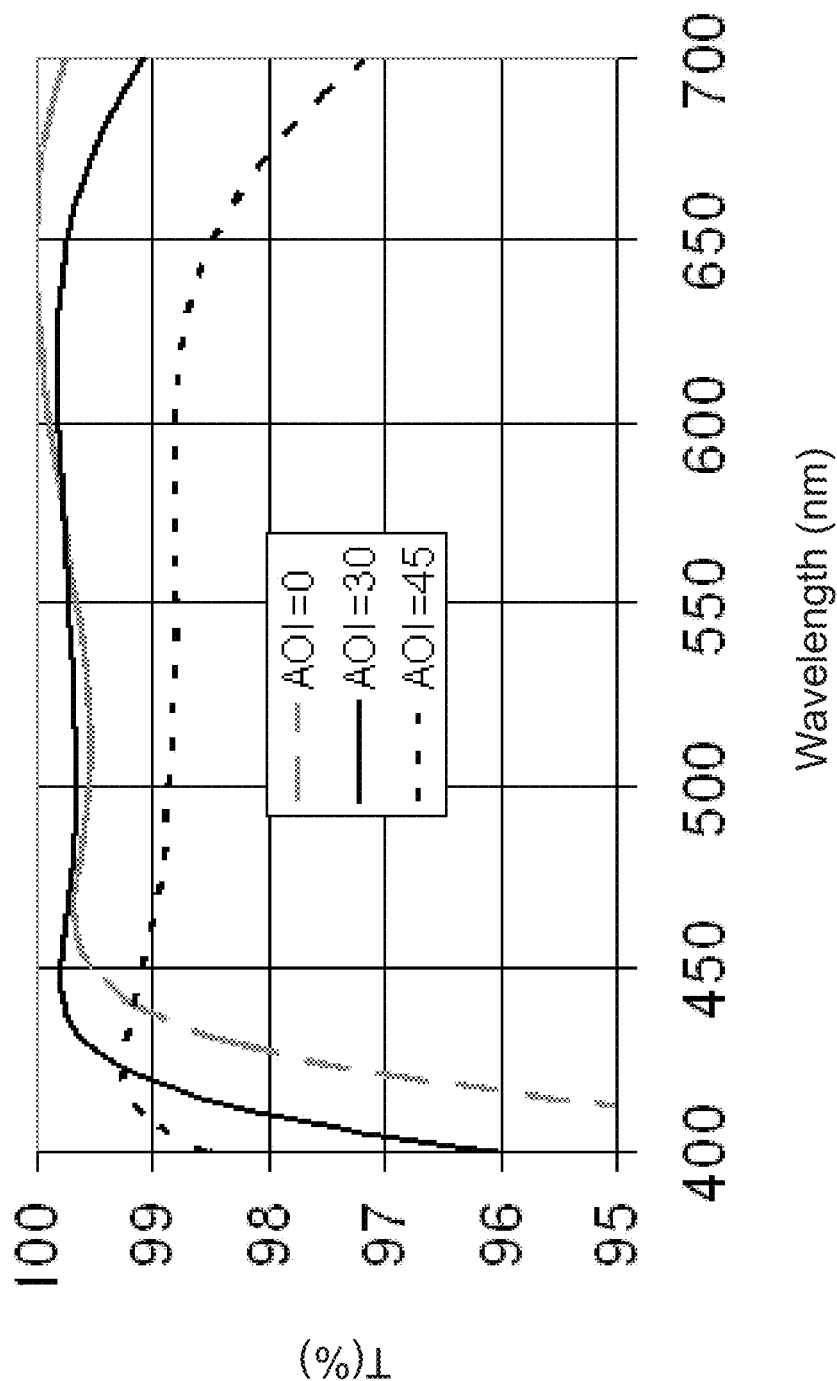
FIG. 10 is a graph illustrating optical performance of an optical window having the structure shown in FIG. 5 with visible light at 0-degree, 30-degree, and 45-degree angle of incidence.

One specific embodiment of the 4 L-structure AR coating 101 constructed according to the first aspect of the present invention is described below in Table 3. In the embodiment of Table 3, the coating material of the first layer 105 is magnesium fluoride (VL in Table 1); the coating material of the second layer 107 and fourth layer 111 is tantalum pentoxide (MH in Table 1); and the coating material of the third layer 109 is silicon dioxide (L material in Table 1). Thus, the embodiment of Table 3 has the multilayer structure IV in Table 2. The reference wavelength is selected to be 550 nm for a visible light optical window. FIG. 7 is transmission and reflection spectra with visible light at 30-degree angle of incidence (AOI) on a double-sided AR-coated optical window, where the AR coating has the structure described in Table 3. The upper curve in FIG. 7 is the transmittance, and the lower group of curves is the reflectivity (R). The reflection spectra are from the front surface of the substrate. The transmission spectra considered glass and AR coating on both sides of the glass substrate. FIG. 10 is transmission spectra with visible light at 0-degree, 30-degree, and 45-degree angle of incidence (AOI) on a double-sided AR-coated optical window, where the AR coating has the structure described in Table 3.

TABLE 2

| Multilayer structure | I | II | III | IV | Refractive index (n) |
|---|---|---|---|---|---|
| layer 105 | VL | VL | VL | VL | n < 1.4 |
| layer 107 | H | H | MH | MH | n ≥ 1.8 |
| layer 109 | L | L | L | L | 1.4 ≤ n < 1.6 |
| layer 111 | H | MH | H | MH | n ≥ 1.8 |
| substrate 103 | glass or glass-ceramic | glass or glass-ceramic | glass or glass-ceramic | glass or glass-ceramic | |

The 4 L-structure AR coating 101 may be described in terms of the optical thicknesses of the layers 105, 107, 109, 111. The optical thickness of a layer is the product of the physical thickness of the layer and the refractive index of the layer. Because refractive index varies with wavelength, optical thickness will also vary with wavelength. Therefore, it is customary to define optical thickness relative to a reference wavelength $\lambda_o$.

TABLE 3

| | Material | Refractive Index at 550 nm | Optical Thickness ($\lambda_o$ = 550 nm) | Physical Thickness (nm) |
|---|---|---|---|---|
| | Air | | | |
| layer 105 | $MgF_2$ | 1.379 | 0.241 | 96 |
| layer 107 | $Ta_2O_5$ | 2.078 | 0.491 | 130 |

TABLE 3-continued

| | Material | Refractive Index at 550 nm | Optical Thickness ($\lambda_o$ = 550 nm) | Physical Thickness (nm) |
|---|---|---|---|---|
| layer 109 | $SiO_2$ | 1.458 | 0.101 | 38 |
| layer 111 | $Ta_2O_5$ | 2.078 | 0.049 | 13 |

TABLE 3-continued

| | Material | Refractive Index at 550 nm | Optical Thickness ($\lambda_o$ = 550 nm) | Physical Thickness (nm) |
|---|---|---|---|---|
| substrate 103 | CORNING Eagle XG glass | 1.509 | | |
| Total Thickness | | | 0.882 | 277 |

In a second aspect of the present invention, the optical thickness of the first layer 105 is (0.23±5%) $\lambda_o$ nm; the optical thickness of the second layer 107 is (0.35±5%) $\lambda_o$ nm; the optical thickness of the third layer 109 is (0.06±10%) $\lambda_o$ nm; and the optical thickness of the fourth layer 111 is (0.06±10%) $\lambda_o$ nm. In the second aspect, the reference wavelength $\lambda_o$ is selected from the infrared range. The reference wavelength $\lambda_o$ may be selected from the range of 1460 nm to 1635 nm. Preferably, the reference wavelength $\lambda_o$ is 1550 nm. Note that the optical design of the second aspect of the present invention, like the optical design of the first aspect of the present invention, adheres to the layer stack sequence described in Table 2. However, the optical thickness sequence of the optical design of the second aspect of the present invention is different from that of the first aspect of the present invention.

Figure 8:
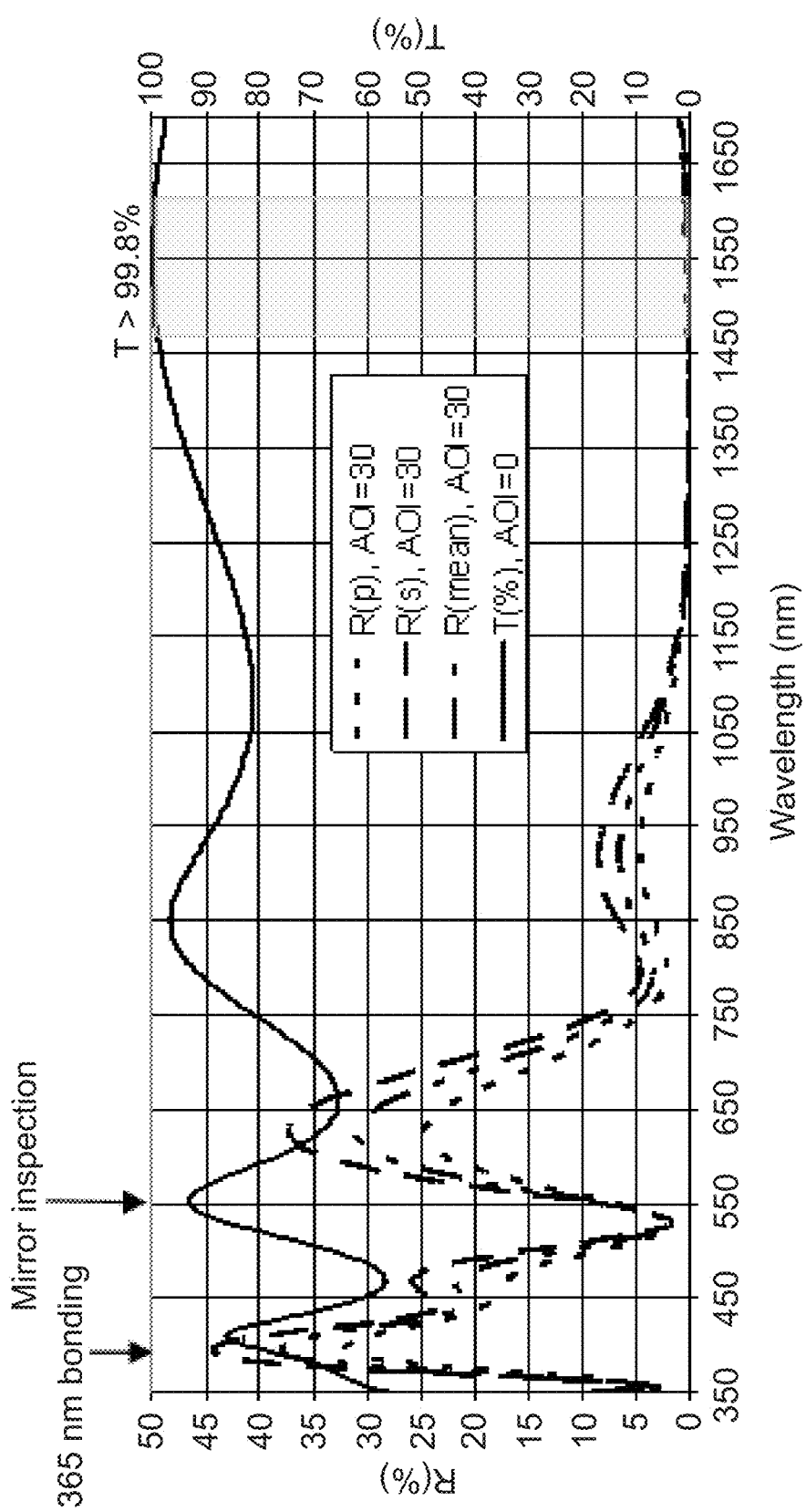
FIG. 8 is a graph illustrating optical performance of another optical window having the structure shown in FIG. 5.

One specific embodiment of the 4 L-structure AR coating 101 constructed according to the second aspect is described below in Table 4. In the embodiment of Table 4, the coating material of the first layer 105 is magnesium fluoride (VL in Table 1); the coating material of the second layer 107 and fourth layer 111 is tantalum pentoxide (MH in Table 1); and the coating material of the third layer 109 is silicon dioxide (L in Table 1). The reference thickness is selected to be 1550 nm for an infrared optical window. The embodiment of Table 4 has the multilayer structure IV in Table 2. The optical performance of the coated substrate is shown in FIG. 8. FIG. 8 is transmission and reflection spectra of a double-sided AR-coated optical window, with the AR coating having the structure shown in Table 4. The optical design covers S-band (1460 to 1530 nm), C-band (1530 to 1563), and L-band (1565 to 1635 nm) with reflectivity less than 0.1% at S-band. In FIG. 8, high transmittance at 550 nm is for the optical metrology system to check if each optical window can be activated, and the high transmittance at 365 nm is for epoxy UV curing. The upper curve in FIG. 8 is the transmittance, and the lower group of curves is the reflectivity (R). The reflection spectra are from the front surface of the substrate. The transmission spectra considered glass (as the substrate) and AR coating on both sides of the glass substrate.

TABLE 4

| | Material | Refractive Index | Optical Thickness ($\lambda_o$ = 1550 nm) | Physical Thickness (nm) |
|---|---|---|---|---|
| | Air | | | |
| layer 105 | MgF$_2$ | 1.379 | 0.231 | 260 |
| layer 107 | Ta$_2$O$_5$ | 2.078 | 0.353 | 264.5 |
| layer 109 | SiO$_2$ | 1.463 | 0.061 | 64.4 |
| layer 111 | Ta$_2$O$_5$ | 2.067 | 0.063 | 47.2 |
| substrate 103 | CORNING EAGLE XG glass | 1.472 | | |
| Total Thickness | | | 0.708 | 636.1 |

Figure 9:
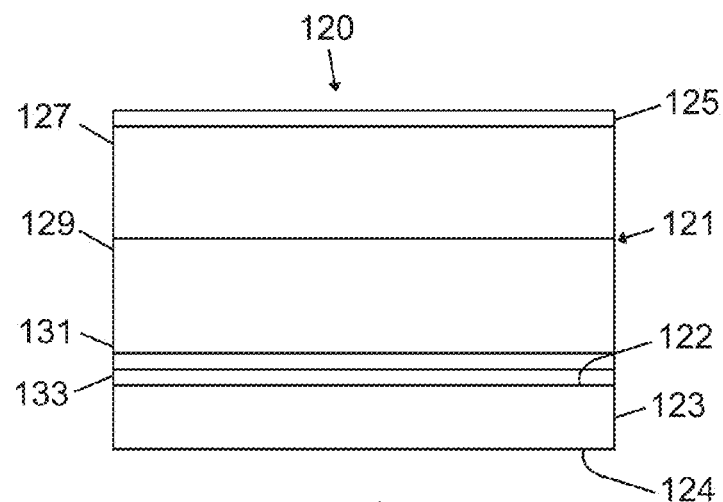
FIG. 9 is a schematic of an optical window according to another aspect of the present invention.

FIG. 9 shows an optical window 120 including a 5-layer structure (5 L structure) AR coating 121 applied on a front surface 122 of a substrate 123. The AR coating 121 may also be applied to the back surface 124 of the substrate 123 (e.g., as illustrated for the 4-layer AR-coated optical window 100 in FIG. 5). The optical window 120 may be incorporated in a DMD device (e.g., as illustrated for the 4-layer AR-coated optical window 100 in FIG. 6). The substrate 123 may be made of a glass or glass-ceramic material that can transmit ER in the visible light range. The 5 L-structure AR coating 121 includes first (or outermost) layer 125, second layer 127, third layer 129, fourth layer 131, and fifth (or innermost) layer 133. The first layer 125 is made of a M optical coating. The second layer 127 is made of a VL or L optical coating. The third layer 129 is made of an H optical coating. The fourth layer 131 is made of a L optical coating. The fifth layer 133 is made of an MH optical coating. Thus, the multilayer structure of the optical window 120 can be expressed as M/(VL or L)/H/L/MH/substrate. Table 5 shows the different possibilities for the multilayer structure of the optical window 120 (Note that Table 5 only shows AR coating on one side of the substrate, but the AR coating can be on both sides of the substrate. For an optical window having AR coating on both sides of the substrate, the multilayer structure of the optical window can be expressed as M/(VL or L)/H/L/MH/substrate/MH/L/H/(VL or L)/M.)

TABLE 5

| Multilayer structure | I | II | Refractive index (n) |
|---|---|---|---|
| layer 125 | M | M | 1.6 ≤ n < 1.8 |
| layer 127 | VL | L | n < 1.6 |
| layer 129 | H | H | n ≥ 2.2 |
| layer 131 | L | L | n < 1.4 |
| layer 133 | MH | MH | 1.8 ≤ n < 2.2 |
| substrate 123 | glass or glass-ceramic | glass or glass-ceramic | |

The 5 L-structure AR coating 121 may be described in terms of the optical thicknesses of the layers 125, 127, 129, 131, 133. In a third aspect of the present invention, the optical thickness of the first layer 125 is (0.02±10%) $\lambda_o$ nm; the optical thickness of the second layer 127 is (0.23±5%) $\lambda_o$ nm; the optical thickness of the third layer 129 is (0.50±5%) $\lambda_o$ nm; the optical thickness of the fourth layer 131 is (0.09±10%) $\lambda_o$ nm; and the optical thickness of the fifth layer 133 is (0.09±10%) $\lambda_o$ nm. In the third aspect, the reference wavelength $\lambda_o$ is selected from the visible light range. The reference wavelength may be in a range of 480 nm to 560 nm. Preferably, the reference wavelength $\lambda_o$ is 550 nm.

Figure 11:
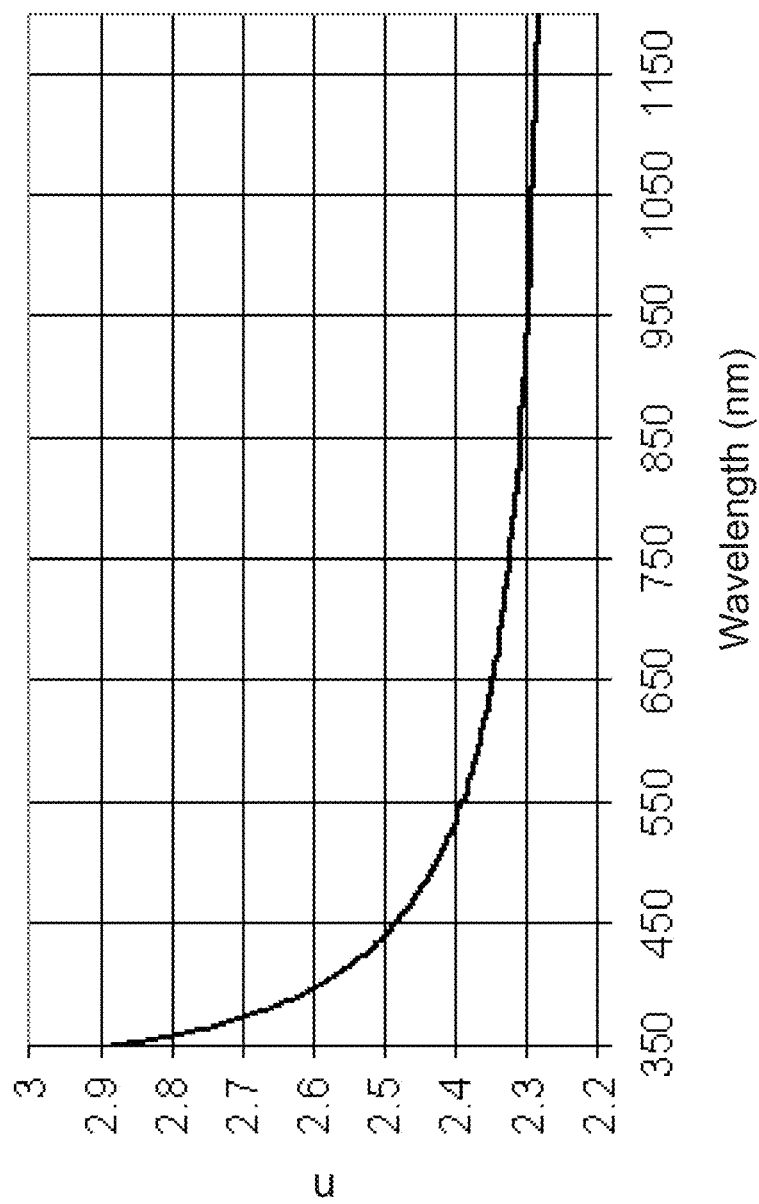
FIG. 11 is a graph illustrating material dispersion, i.e., dependence of refractive index on wavelength, for MO-01 (Nb$_2$O$_5$:TiO$_2$=1:1 (mol %)).

One specific embodiment of the 5 L-structure coating 121 constructed according to the third aspect of the present invention is described below in Table 6. In the embodiment of Table 6, the coating material of the first layer 125 is aluminum oxide (M in Table 1); the coating material of the second layer 127 and the fourth layer 131 is silicon dioxide (L material in Table 1); the coating material of the third layer 129 is MO-01 (H material in Table 1); and the coating material of the fifth layer 133 is tantalum pentoxide (MH in Table 1). Thus, the embodiment of Table 6 has the multilayer structure II in Table 5. MO-01 is a compound made from Nb$_2$O$_5$:TiO$_2$=1:1 (mol %). MO-01 is a high-index material with low near-UV (NUV) absorption and excellent electron beam (E-beam) melting properties without splattering. FIG. 11 shows material dispersion of IAD-EB deposited MO-01.

TABLE 6

|  | Material | Refractive Index | Optical Thickness ($\lambda_o$ = 550 nm) | Physical Thickness (nm) | Geometric Thickness |
|---|---|---|---|---|---|
|  | Air | 1 |  |  |  |
| layer 125 | Al$_2$O$_3$ | 1.673 | 0.018 | 5.76 | 0.011 |
| layer 127 | SiO$_2$ | 1.462 | 0.228 | 79.68 | 0.156 |
| layer 129 | MO-01 | 2.416 | 0.509 | 107.52 | 0.211 |
| layer 131 | SiO$_2$ | 1.462 | 0.086 | 29.86 | 0.059 |
| layer 133 | Ta$_2$O$_5$ | 2.068 | 0.087 | 21.41 | 0.042 |
| substrate 123 | CORNING EAGLE XG glass | 1.472 |  |  |  |
| Total Thickness |  |  | 0.928 | 244.23 | 0.479 |

The coatings of the present invention can be placed on windows of DMD devices that transmit light in a desired wavelength range. DMD windows can be used from ultraviolet (lithography applications) to visible (display applications) to near-infrared (telecom devices) wavelength range. The coatings of the present invention can be used in conjunction with other optical elements, whether they are in systems using DMD devices (e.g., projectors and televisions) or systems that do not use such devices (e.g., optical telescopes, camera, and eyeglasses). The coatings of the present invention may be deposited on a substrate that can transmit light by any method known in the art for depositing coating materials on a substrate, including, but not limited to, sputtering by an electron beam (E-beam), with or without ion-assist; ion sputtering; chemical vapor deposition (CVD); laser ablation; atomic layer deposition; and other methods known to those skilled in the art. The preferred methods are E-beam deposition and ion-assisted E-beam deposition. Alternatively, the coatings of the present invention may be bonded to a substrate that can transmit light using a suitable bonding material, such as UV-curable epoxy.

The substrate for deposition of the coatings of the present invention (e.g., substrate 103 in FIG. 5 and substrate 123 in FIG. 9) can be any material that can transmit light in a desired wavelength range determined by the application. For example, the substrate may transmit light in a wavelength range selected from ultraviolet range (200 nm to 400 nm), visible range (400 nm to 760 nm), and near-infrared range (800 to 1700 nm) The preferred substrates are glass and glass-ceramics, e.g., CORNING 7065 glass, fused silica glass, CORNING high purity fused silica (HPFS®), CORNING EAGLE XG glass, and other glass or glass-ceramic substrates known in the art that are transmissive to light in the visible range. Prior to deposition of the coating materials the surfaces of the glass substrate are preferably polished and cleaned to remove traces of polishing agents, oils and other substances that may negatively impact the deposition of the coating materials. The coating materials may be applied to the front face, the back face, or both the front and back faces of the substrate.

AR coating reduces glass surface reflections by actually generating reflections of its own. By correctly selecting the thickness of every layer in the AR coating, the light waves reflected from the AR surface are 180 degrees out of phase with light waves reflected from the surface of other interfaces. Then, the reflected light waves undergo destructive interference and effectively cancel each other out. Accordingly to the Law of Conservation of Energy, energy can neither be created nor destroyed. Thus, the energy from the canceled waves is transferred through the glass medium to the viewer's eyes to improve contrast and clarity.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A multilayer anti-reflective coating for a substrate, comprising:
    (a) a first layer having a refractive index n1, where n1<1.4, and an optical thickness of (0.25±5%) $\lambda_o$ nm, which in expanded form is a range of (0.25-5% of 0.25) $\lambda_o$ nm to (0.25+5% of 0.25) $\lambda_o$ nm, where $\lambda_o$ is a wavelength in the visible light range;
    (b) a second layer adjacent to the first layer, the second layer having a refractive index n2, where n2≥1.8, and an optical thickness of (0.5±5%) $\lambda_o$ nm, which in expanded form is a range of (0.5-5% of 0.5) $\lambda_o$ nm to (0.5+5% of 0.5) $\lambda_o$ nm, where $\lambda_o$ is a wavelength in the visible light range;
    (c) a third layer adjacent to the second layer, the third layer having a refractive index n3, where 1.4≤n3<1.6, and an optical thickness of (0.1±5%) $\lambda_o$ nm, which in expanded form is a range of (0.1-5% of 0.1) $\lambda_o$ nm to (0.1+5% of 0.1) $\lambda_o$ nm, where $\lambda_o$ is a wavelength in the visible light range; and
    (d) a fourth layer adjacent to the third layer, the fourth layer having a refractive index n4, where n4≥1.8, and an optical thickness of (0.05±10%) $\lambda_o$ nm, which in expanded form is a range of (0.05-10% of 0.05) $\lambda_o$ nm to (0.05+10% of 0.05) $\lambda_o$ nm, where $\lambda_o$ is a wavelength in the visible light range;
    the anti-reflective coating having a coating order of first layer/second layer/third layer/fourth layer, with the first layer being the outermost layer relative to the substrate.

2. The multilayer anti-reflective coating of claim 1, wherein the second layer and the fourth layer comprise a material selected from HfO$_2$, Ta$_2$O$_5$, ZrO$_2$, TiO$_2$:Pr$_2$O$_3$, Nb$_2$O$_5$, TiO$_2$, Nb$_2$O$_5$:TiO$_2$, MO-01, ZrO$_2$, and Y$_2$O$_3$.

3. The multilayer reflective coating of claim 2, wherein the third layer comprises a material selected from SiO$_2$, CaF$_2$, and BaF$_2$.

4. The multilayer reflective coating of claim 3, wherein the first layer comprises MgF$_2$.

5. The multilayer anti-reflective coating of claim 1, wherein $\lambda_o$ is approximately 550 nm.

6. A multilayer anti-reflective coating for a substrate, comprising:
    (a) a first layer having a refractive index n1, where n1<1.4, and an optical thickness of (0.23±5%) $\lambda_o$ nm, which in expanded form is a range of (0.23-5% of 0.23) $\lambda_o$ nm to (0.23+5% of 0.23) $\lambda_o$ nm, where $\lambda_o$ is a wavelength in the infrared range;

(b) a second layer adjacent to the first layer, the second layer having a refractive index n2, where n2≥1.8, and an optical thickness of (0.35±5%) $\lambda_o$ nm, which in expanded form is a range of (0.35–5% of 0.35) $\lambda_o$ nm to (0.35+5% of 0.35) $\lambda_o$ nm, where $\lambda_o$ is a wavelength in the infrared range;

(c) a third layer adjacent to the second layer, the third layer having a refractive index n3, where 1.4≤n3<1.6, and an optical thickness of (0.06±10%) $\lambda_o$ nm, which in expanded form is a range of (0.06–10% of 0.06) $\lambda_o$ nm to (0.06+10% of 0.06) $\lambda_o$ nm, where $\lambda_o$ is a wavelength in the infrared range; and (d) a fourth layer adjacent to the third layer, the fourth layer having a refractive index n4, where n4≥1.8, and an optical thickness of (0.06±10%) $\lambda_o$ nm, which in expanded form is a range of (0.06–10% of 0.06) $\lambda_o$ nm to (0.06+10% of 0.06) $\lambda_o$ nm, where $\lambda_o$ is a wavelength in the infrared range;

the anti-reflective coating having a coating order of first layer/second layer/third layer/fourth layer, with the first layer being the outermost layer relative to the substrate.

7. The multilayer anti-reflective coating of claim 6, wherein the second layer and the fourth layer comprise a material selected from $HfO_2$, $Ta_2O_5$, $ZrO_2$, $TiO_2$—$Pr_2O_3$, $Nb_2O_5$, $TiO_2$, $Nb_2O_5$:$TiO_2$, MO-01, $ZrO_2$, and $Y_2O_3$.

8. The multilayer reflective coating of claim 7, wherein the third layer comprises a material selected from $SiO_2$, $CaF_2$, and $BaF_2$.

9. The multilayer reflective coating of claim 8, wherein the first layer comprises $MgF_2$.

10. The multilayer anti-reflective coating of claim 6, wherein $\lambda_o$ is approximately 1550 nm.

11. An optical window, comprising:

(i) a glass or glass-ceramic substrate transmissive to light; and (ii) a multilayer anti-reflective coating applied on the substrate, the multilayer anti-reflective coating comprising:

(a) first layer having a refractive index n1, where n1<1.4, and an optical thickness of (0.25±5%) $\lambda_o$ nm, which in expanded form is a range of (0.25–5% of 0.25) $\lambda_o$ nm to (0.25+5% of 0.25) $\lambda_o$ nm, where $\lambda_o$ is a wavelength in the visible light range;

(b) a second layer adjacent to the first layer, the second layer having a refractive index n2, where n2≥1.8, and an optical thickness of (0.5±5%) $\lambda_o$ nm, which in expanded form is a range of (0.5–0.5% of 0.5) $\lambda_o$ nm to (0.5+5% of 0.5) $\lambda_o$ nm, where $\lambda_o$ is a wavelength in the visible light range;

(c) a third layer adjacent to the second layer, the third layer having a refractive index n3, where 1.4≤n3<1.6, and an optical thickness of (0.1±5%) $\lambda_o$ nm, which in expanded form is a range of (0.1–5% of 0.1) $\lambda_o$ nm to (0.1+5% of 0.1) $\lambda_o$ nm, where $\lambda_o$ is a wavelength in the visible light range; and (d) a fourth layer adjacent to the third layer, the fourth layer having a refractive index n4, where n4≥1.8, and an optical thickness of (0.05±10%) $\lambda_o$ nm, which in expanded form is a range of (0.05–10% of 0.05) $\lambda_o$ nm to (0.05+10% of 0.05) $\lambda_o$ nm, where $\lambda_o$ is a wavelength in the visible light range;

the anti-reflective coating having a coating order of first layer/second layer/third layer/fourth layer, with the first layer being the outermost layer relative to the substrate.

12. An optical window, comprising:

(i) a glass or glass-ceramic substrate transmissive to light; and (ii) a multilayer anti-reflective coating applied on the substrate, the multilayer anti-reflective coating comprising:

(a) a first layer having a refractive index n1, where n1<1.4, and an optical thickness of (0.23±5%) $\lambda_o$ nm, which in expanded form is a range of (0.23–5% of 0.23) $\lambda_o$ nm to (0.23+5% of 0.23) $\lambda_o$ nm, where $\lambda_o$ is a wavelength in the infrared range;

(b) a second layer adjacent to the first layer, the second layer having a refractive index n2, where n2≥1.8, and an optical thickness of (0.35±5%) $\lambda_o$ nm, which in expanded form is a range of (0.35–5% of 0.35) $\lambda_o$ nm to (0.35+5% of 0.35) $\lambda_o$ nm, where $\lambda_o$ is a wavelength in the infrared range;

(c) a third layer adjacent to the second layer, the third layer having a refractive index n3, where 1.4≤n3<1.6, and an optical thickness of (0.06±10%) $\lambda_o$ nm, which in expanded form is a range of (0.06–10% of 0.06) $\lambda_o$ nm to (0.06+10% of 0.06) $\lambda_o$ nm, where $\lambda_o$ is a wavelength in the infrared range; and (d) a fourth layer adjacent to the third layer, the fourth layer having a refractive index n4, where n4≥1.8, and an optical thickness of (0.06±10%) $\lambda_o$ nm, which in expanded form is a range of (0.06–10% of 0.06) $\lambda_o$ nm to (0.06+10% of 0.06) $\lambda_o$ nm, where $\lambda_o$ is a wavelength in the infrared range;

the anti-reflective coating having a coating order of first layer/second layer/third layer/fourth layer, with the first layer being the outermost layer relative to the substrate.

* * * * *